F. BÖMINGHAUS.
VEHICLE SPRING.
APPLICATION FILED SEPT. 3, 1920.

1,388,695.

Patented Aug. 23, 1921.

Inventor
Franz Böminghaus,
By Knight Bros.
Attorneys

UNITED STATES PATENT OFFICE.

FRANZ BÖMINGHAUS, OF ESSEN, GERMANY, ASSIGNOR TO FRIED. KRUPP AKTIENGESELLSCHAFT, OF ESSEN-ON-THE-RUHR, GERMANY.

VEHICLE-SPRING.

1,388,695.   Specification of Letters Patent.   Patented Aug. 23, 1921.

Application filed September 3, 1920. Serial No. 408,095.

*To all whom it may concern:*

Be it known that I, FRANZ BÖMINGHAUS, residing at Essen, Germany, a citizen of the German Republic, have invented a certain new and useful Improvement in Vehicle-Springs, (for which I have filed an application in Germany, Jan. 22, 1919,) of which the following is a specification.

This invention relates to vehicle suspensions of the type in which the springs are caused to act on a pivotally arranged limb rigidly attached to the axle and the object of the invention is to provide a suspension of this type, which enables a vehicle, which is not elastically supported to be subsequently provided in a simple manner with elastically supported axle limbs.

The invention will be described with reference to the accompanying drawings, which show the invention applied to a gun carriage.

Figure 1:
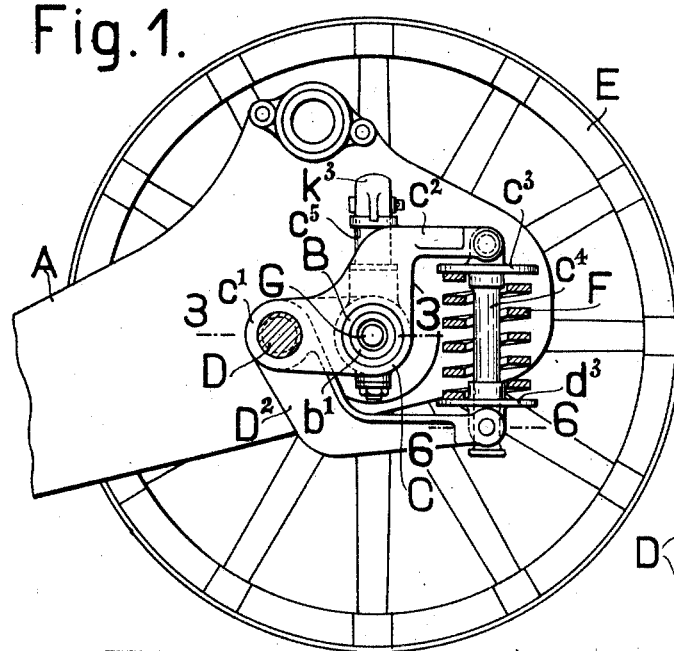
Figure 6:
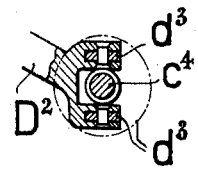
Figure 3:
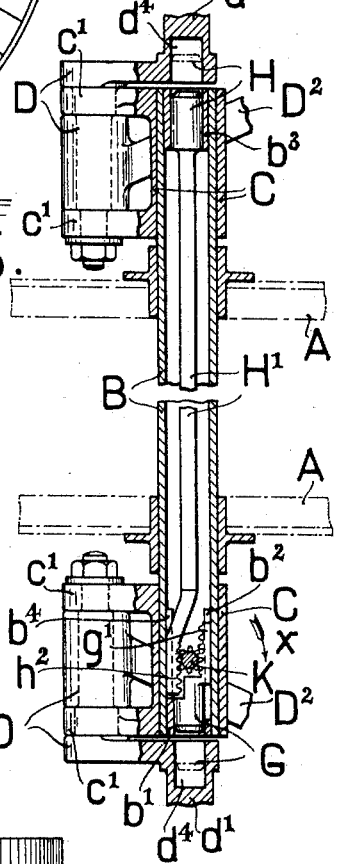
Figures 2, 4, 5:
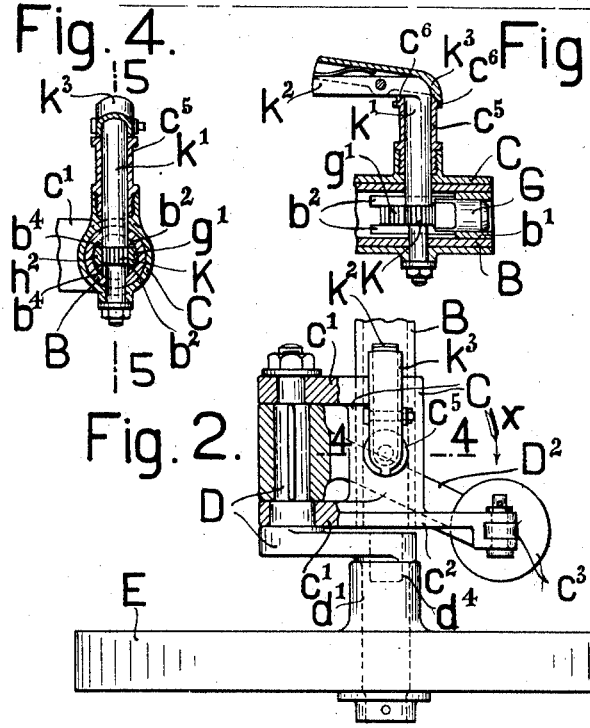

Figure 1 is a side elevation, partly in section, of the parts of the gun carriage pertaining to this invention the front wheel having been removed, Fig. 2 is a corresponding plan view, partially in section, with the front wheel in place, Fig. 3 is a section on the line 3—3 of Fig. 1, Fig. 4 is a section on the line 4—4 of Fig. 2, Fig. 5 is a section on the line 5—5 of Fig. 4 and Fig. 6 is a section on the line 6—6 of Fig. 1.

The two original limbs of the hollow wheel axle B, which is rigidly attached in the well known manner to the body A of the gun carriage (see Figs. 1 and 3) are cut off. On each end of the still remaining central part of the wheel axle is fixed a bearing piece C, which has two arms $c^1$ (see particularly Figs. 2 and 3) at right angles to the axis of wheel axle B. In these arms is pivotally mounted an axle limb D constructed in the form of a crank, on the pin $d^1$ of which the gun carriage wheel E turns. Between an arm $D^2$, which is attached to the axle limb D but which does not rotate relatively thereto, and an arm $c^2$ mounted on the bearing piece C (see Figs. 1 and 2) is interposed vertically an initially compressed helical spring F (see Fig. 1), and which spring F bears at one end against an abutment $c^3$ pivoted to the arm $c^2$ carrying a guide bolt $c^4$ (see Figs. 1 and 6) for the spring F and at its other end against abutment $d^3$ provided for the bolt $c^4$ and sliding on it and pivotally connected to the arm $D^2$.

The arrangement of the cranking of the limbs D of the axle and the compression of the springs F is so devised, that, when the load is stationary the geometrical axes of the pins $d^1$, which carry the wheels E of the gun carriage, coincide with the geometrical axis of the wheel axle B. When the vehicle is in motion, the limbs D of the axle swing in the arms $c^1$, so that shocks are absorbed by the springs F.

The particular distinguishing feature of the arrangement described is, that the suspension can be applied in a simple manner and without any further alteration of the vehicle to vehicles not originally provided with springs by using the central part of the existing rigid wheel axle and that the masses, which are not elastically supported (*i. e.* the wheels and the two limbs D of the axle) are comparatively small.

When the gun is being fired, it is desirable to dispense with the elastic suspension and to be able to support the body A of the gun carriage rigidly with respect to the wheels E. For this purpose the following arrangement has been devised. Each of the limbs D of the axle is provided with a cylindrical slot $d^4$ facing the wheel axle B (see Figs. 2 and 3) into which a bolt G or H guided on the wheel axle can be pushed (see particularly Fig. 3), which bolt G slides in a sleeve $b^1$ mounted on the wheel axle B (see also Fig. 5). It consists of one piece with a rack $g^1$, which is guided on ribs $b^2$ (see Figs. 3 to 5) on the sleeve $b^1$. The bolt H, which is carried by a sleeve $b^3$ fixed on the wheel axle B is mounted on a bar $H^1$ arranged in the hollow part of the wheel axle (see Fig. 3) and its other end is constructed in the form of a rack $h^2$, and which rack $h^2$ is guided on ribs $b^4$ opposite the ribs $b^2$ on the sleeve $b^1$ (see also Fig. 4). With the two racks $g^1$, $h^2$ gears a toothed wheel K (see Figs. 3 to 5), the shaft $k^1$ of which is at right angles to the axis of the wheel axle B (see Figs. 4 and 5) and is mounted in a sleeve $c^5$ screwed to the bearing piece C. A hand lever $k^2$ mounted on the shaft $k^1$ carries a pawl $k^3$ of the usual kind, which embraces it and which is intended to engage with two slots $c^6$ provided in the sleeve $c^5$ and situated diametrically opposite each other and thereby lock the hand lever $k^2$ in two positions. When the bolts G, H are not engaged in the slots $d^4$, the limbs D of the axle can swing in the arms $c^1$ and the springs F come into action. If the suspension is to be dispensed with the toothed wheel K is rotated by the handle $k^2$ through an angle of 180° in the direction of the arrow $x$ (see Figs. 2 and 3), so that the bolts G, H are thrust into the slots $d^4$ (see the position indicated by dot and dash lines in Fig. 3), the limbs D of the axle being prevented thereby from moving relatively to the wheel axle B which is rigidly connected to the body A of the gun carriage.

Claims:

1. In a vehicle suspension mechanism, the combination with an axle of a limb or extension thereof, a bearing piece in which said limb is mounted parallel to and eccentrically of the axle but with its pin substantially coaxial with the axle, and a spring arranged to take up relative motion between the limb and axle.

2. In a construction such as described in claim 1, the bearing piece carrying an abutment for said spring.

3. In a construction such as set forth in claim 1, the limb and axle having engaging locking members to prevent relative movement.

4. In a construction such as set forth in claim 3, the limb having sockets and the axle having manually operated oppositely acting bolts to engage said sockets.

The foregoing specification signed at Essen, Germany, this 27th day of May, 1920.

FRANZ BÖMINGHAUS.

In presence of—
 HANS GOTTSMANN,
 JOSEF OLCERTZ.